US008571369B2

(12) United States Patent
Tatat (10) Patent No.: US 8,571,369 B2
(45) Date of Patent: Oct. 29, 2013

(54) OPTICAL-FIBER MODULE HAVING IMPROVED ACCESSIBILITY (75) Inventor: Olivier Tatat, Sangatte (FR)

(73) Assignee: Draka Comteq B.V., Amsterdam (NL)

( * ) Notice: Subject to any disclaimer, the term of this patent is extended or adjusted under 35 U.S.C. 154(b) by 50 days.

(21) Appl. No.: 13/222,329

(22) Filed: Aug. 31, 2011

(65) Prior Publication Data
US 2012/0057833 A1 Mar. 8, 2012

Related U.S. Application Data (60) Provisional application No. 61/379,931, filed on Sep. 3, 2010.

(51) Int. Cl.
G02B 6/44 (2006.01)
(52) U.S. Cl.
USPC .......................................... 385/111; 523/200
(58) Field of Classification Search
USPC .......................................... 385/111; 523/200
See application file for complete search history.

(56) References Cited

U.S. PATENT DOCUMENTS

| 4,838,643 | A | 6/1989 | Hodges et al. |
|---|---|---|---|
| 5,181,268 | A | 1/1993 | Chien |
| 5,408,564 | A | 4/1995 | Mills |
| 5,574,816 | A | 11/1996 | Yang et al. |
| 5,717,805 | A | 2/1998 | Stulpin |
| 5,761,362 | A | 6/1998 | Yang et al. |
| 5,761,363 | A | 6/1998 | Mills |
| 5,911,023 | A | 6/1999 | Risch et al. |
| 5,982,968 | A | 11/1999 | Stulpin |
| 6,035,087 | A | 3/2000 | Bonicel et al. |
| 6,066,397 | A | 5/2000 | Risch et al. |
| 6,085,009 | A | 7/2000 | Risch et al. |
| 6,134,363 | A | 10/2000 | Hinson et al. |
| 6,175,677 | B1 | 1/2001 | Yang et al. |
| 6,181,857 | B1 | 1/2001 | Emeterio et al. |
| 6,210,802 | B1 | 4/2001 | Risch et al. |
| 6,215,931 | B1 | 4/2001 | Risch et al. |
| 6,314,224 | B1 | 11/2001 | Stevens et al. |
| 6,321,012 | B1 | 11/2001 | Shen |
| 6,321,014 | B1 | 11/2001 | Overton et al. |
| 6,334,016 | B1 | 12/2001 | Greer, IV |
| 6,381,390 | B1 | 4/2002 | Hutton et al. |

(Continued)

FOREIGN PATENT DOCUMENTS

| EP | 0527266 A1 | 2/1993 |
|---|---|---|
| EP | 0690033 A1 | 1/1996 |

(Continued)

OTHER PUBLICATIONS

Kraton, "Kraton Polymers and Compounds", Typical Properties Guide, K0137, (2006), pp. 1-16.

(Continued)

Primary Examiner — Charlie Peng
Assistant Examiner — Peter Radkowski
(74) Attorney, Agent, or Firm — Additon, Higgins, Pendleton & Ashe, P.A.

(57) ABSTRACT

The present invention relates to optical-fiber modules having improved accessibility. In a typical embodiment, the optical-fiber module includes one or more optical fibers surrounded by an intermediate layer. The intermediate layer typically includes a polymeric medium with a liquid lubricant dispersed therein. A buffer tube encloses the optical fibers and the intermediate layer.

22 Claims, 7 Drawing Sheets

(56) References Cited

U.S. PATENT DOCUMENTS

| | | |
|---|---|---|
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,775,443 B2 | 8/2004 | Bringuier et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,702,204 B2 | 4/2010 | Gonnet et al. |
| 7,724,998 B2 | 5/2010 | Parris et al. |
| 7,817,891 B2 | 10/2010 | Lavenne et al. |
| 7,889,960 B2 | 2/2011 | de Montmorillon et al. |
| 7,970,247 B2 | 6/2011 | Barker |
| 7,974,507 B2 | 7/2011 | Lovie et al. |
| 2004/0063812 A1* | 4/2004 | Sohal .................. 523/200 |
| 2004/0109652 A1* | 6/2004 | Risch et al. ............ 385/102 |
| 2008/0076854 A1* | 3/2008 | Sohal .................. 523/173 |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297106 A1* | 12/2009 | Pizzorno et al. ............ 385/109 |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1* | 4/2010 | Overton .................. 385/112 |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1* | 8/2010 | Tatat et al. ............ 385/113 |
| 2010/0254653 A1 | 10/2010 | Molin et al. |
| 2010/0310218 A1 | 12/2010 | Molin et al. |
| 2011/0026889 A1* | 2/2011 | Risch et al. ............ 385/102 |
| 2011/0044595 A1 | 2/2011 | Sillard et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0103754 A1 | 5/2011 | Testu et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc |
| 2011/0229101 A1 | 9/2011 | de Montmorillon |
| 2011/0268398 A1 | 11/2011 | Quinn et al. |
| 2011/0268400 A1 | 11/2011 | Lovie et al. |
| 2011/0287195 A1 | 11/2011 | Molin |
| 2012/0009358 A1 | 1/2012 | Gharbi et al. |
| 2012/0014652 A1 | 1/2012 | Parris |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |

FOREIGN PATENT DOCUMENTS

| | | |
|---|---|---|
| EP | 0838703 A1 | 4/1998 |
| EP | 1921478 A1 | 5/2008 |
| EP | 2426538 A2 | 3/2012 |
| WO | 2009/062131 A1 | 5/2009 |
| WO | 2009/091243 A1 | 7/2009 |

OTHER PUBLICATIONS

Henkel, "Macroplast CF 405", Technical Information, TICF405eDOC, Aug. 27, 2002, pp. 1.

U.S. Appl. No. 61/379,931, for "Optical-Fiber Module Having Improved Accessibility", filed Sep. 3, 2010, pp. 1-40.

* cited by examiner

OPTICAL-FIBER MODULE HAVING IMPROVED ACCESSIBILITY

CROSS-REFERENCE TO PRIORITY APPLICATION

This application hereby claims the benefit of U.S. Patent Application No. 61/379,931 for an Optical-Fiber Module Having Improved Accessibility (filed Sep. 3, 2010), which is hereby incorporated by reference in its entirety.

FIELD OF THE INVENTION

The present invention relates to optical-fiber modules having improved accessibility.

BACKGROUND

As compared with traditional wire-based networks, optical-fiber communication networks are capable of transmitting significantly more information at significantly higher speeds. Optical fibers, therefore, are being increasingly employed in communication networks.

Within fiber optic networks, tight buffered optical fibers are commonly employed in various applications where space is limited. One problem encountered when using tight buffered optical fibers is that of accessibility. It is desirable to be able to remove the protective buffer tube quickly so that the enclosed optical fiber can be readily accessed.

Semi-tight buffered optical fibers and loose buffer tubes provide improved accessibility by providing a gap between the buffer tube and enclosed optical fiber(s). This gap, however, provides space that can allow the enclosed optical fiber(s) to buckle or otherwise bend, particularly during any buffer-tube shrinking or stretching. This buckling or bending can lead to undesirable attenuation.

Accordingly, a need exists for an optical-fiber module (e.g., a buffer tube) having improved accessibility and satisfactory attenuation characteristics.

SUMMARY

Accordingly, in one aspect, the present invention embraces an optical-fiber module. The optical-fiber module typically includes one or more optical fibers surrounded by an intermediate layer. The intermediate layer typically includes a polymeric medium, such as a thermoplastic gel. A liquid lubricant may be dispersed within the polymeric medium. A buffer tube encloses the optical fibers and the intermediate layer.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the present invention embraces an optical-fiber module that possesses excellent strippability (e.g., accessibility to the optical fibers).

Figure 1:
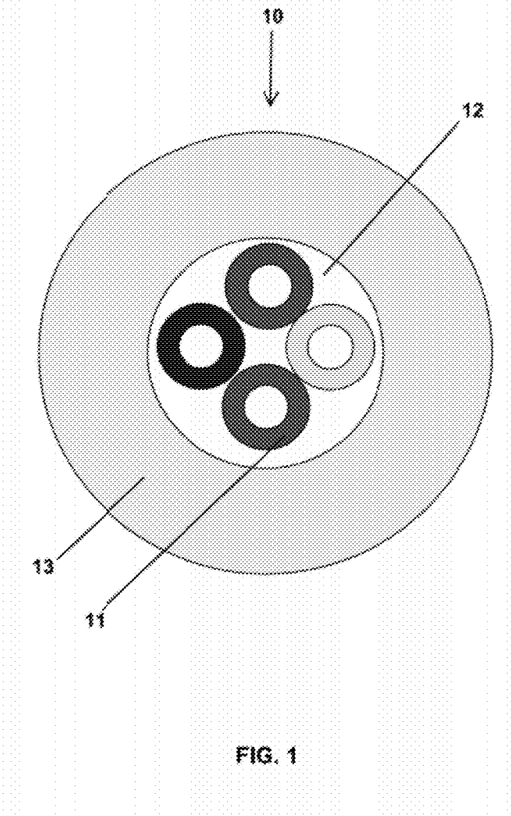
FIG. 1 schematically depicts an exemplary optical-fiber module in accordance with the present invention.
Figure 2:
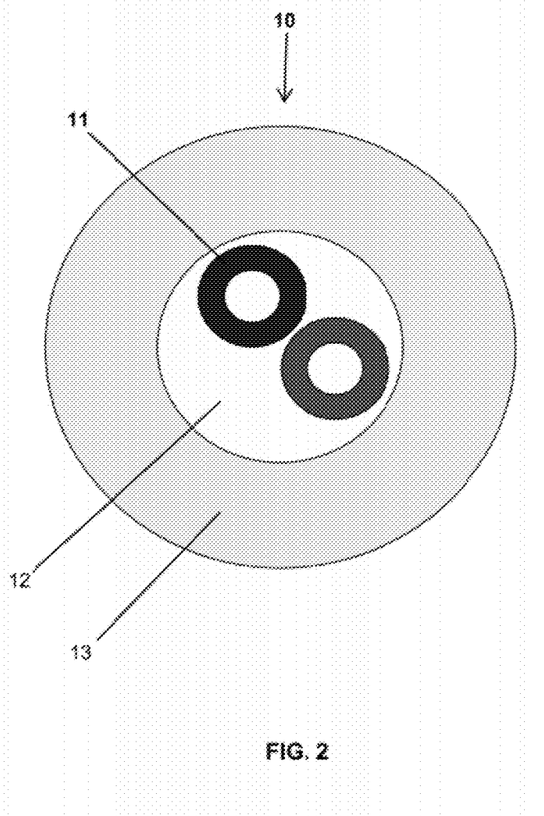
FIG. 2 schematically depicts another exemplary optical-fiber module in accordance with the present invention.

FIGS. 1 and 2 schematically depict exemplary optical-fiber modules 10 in accordance with the present invention. Each optical-fiber module 10 includes one or more optical fibers 11. FIG. 1 depicts an optical-fiber module 10 having four optical fibers, and FIG. 2 depicts an optical-fiber module 10 having two optical fibers. FIGS. 1 and 2 each depict (i) an intermediate layer 12 surrounding the optical fibers 11 and (ii) a buffer tube 13 enclosing the optical fibers 11 and the intermediate layer 12. Typically, there is no free space between the optical fibers 11 and the intermediate layer 12. Moreover, there is typically no annular free space between the intermediate layer 12 and the buffer tube 13. In other words, the buffer tube 13 typically tightly surrounds the intermediate layer 12.

The intermediate layer 12, which at least partially fills the free space within the buffer tube 13, typically has the consistency of a flexible gel over the entire operating temperature range of the optical-fiber module, such as from about $-20°$ C. to $60°$ C. Wider operating temperature ranges (e.g., from about $-40°$ C. to $70°$ C., such as from about $-30°$ C. to $70°$ C.) are also possible. The flexibility of the material of the intermediate layer 12 allows the mechanical stresses on the optical fibers 11 to be limited while ensuring adequate coupling between the optical fibers 11 and the buffer tube 13. The intermediate layer 12 usually includes a hot-melt seal-and-peel material. In this regard, a "hot-melt" material is a material that becomes fluid when sufficiently heated. A "seal-and-peel" material is a material that can be removed without leaving much residue, if any.

Accordingly, the intermediate layer 12 includes a polymeric material (e.g., a polymeric medium). Typically, the polymeric material is a thermoplastic gel, such as a thermoplastic gel formulated from synthetic hydrocarbon polymers. Suitable thermoplastic gels are Macroplast CF 405 and Macroplast CF 412, which are commercially available from Henkel KGaA. Technical information related to Macroplast CF 405 thermoplastic gel is provided as Appendix I of priority U.S. Patent Application No. 61/379,931. As noted, U.S. Patent Application No. 61/379,931, including Appendix I, is incorporated by reference in its entirety, To ensure that the intermediate layer has suitable mechanical properties over the typical operating range of the optical-fiber module, the thermoplastic gel typically has a softening point that is greater than $70°$ C. (e.g., $80°$ C. or more). The softening point may be measured in accordance with the ASTM E 28 test method. The thermoplastic gel also typically has a glass transition temperature that is less than $-40°$ C. (e.g., $-50°$ C. or less). The glass transition temperature may be measured using differential scanning calorimetry ("DSC") employing a temperature change of $15°$ K/min. By way of example, Macroplast CF 412 thermoplastic gel has a softening point of about $112°$ C. and a glass transition temperature of less than about $-80°$ C.

The thermoplastic gel is typically a relatively soft material. The hardness of the thermoplastic gel may be measured in accordance with the NFT 60-119 standard. Accordingly, the thermoplastic gel typically has a penetrability of at least about 1.0 millimeter, such as at least 1.2 millimeters, over the temperature range of −30° C. to 70° C. as measured in accordance with the NFT 60-119 standard with an application time of five seconds. In this regard, Macroplast CF 412 thermoplastic gel has been measured to have a penetrability of 1.2 millimeters at −30° C. as measured in accordance with the NFT 60-119 standard with an application time of five seconds.

In some embodiments, the thermoplastic gel may have a penetrability of at least about 1.5 millimeters, such as at least about 2.5 millimeters (e.g., 3.0 millimeters or more), over the temperature range of −40° C. to 70° C. as measured in accordance with the NFT 60-119 standard with an application time of five seconds. In this regard, Macroplast CF 405 thermoplastic gel has been observed to have a penetrability of 3.5 millimeters at −40° C., 7.0 millimeters at 20° C., and 14.0 millimeters at 70° C., as measured in accordance with the NFT 60-119 standard with an application time of five seconds.

An optical-fiber module that include a buffer tube surrounding an optical fiber positioned within a thermoplastic gel is disclosed in commonly assigned International Patent Publication No. WO 2009/091243 A1 (published Jul. 23, 2009), which is hereby incorporated by reference in its entirety.

That said, other materials having similar physical properties (e.g., hardness and elasticity) to thermoplastic gels may be used. For example, the polymeric material may be a thermoplastic material with or without crosslinking (e.g., block copolymers, such as Kraton® thermoplastic elastomers). By way of further example, the polymeric material may be a thermoset material.

Notwithstanding the foregoing, to facilitate enhanced stripping of the buffer tube 13 and the intermediate layer 12 from the optical fibers 11, the present optical-fiber modules employ lubricant. The intermediate layer 12 typically includes a lubricant, such as an incorporated liquid lubricant (e.g., silicone oil dispersed within a polymeric medium). In a typical embodiment, the intermediate layer 12 includes between about 5 weight percent and 20 weight percent silicone oil. More typically, the intermediate layer 12 includes between about 10 weight percent and 20 weight percent silicone oil (e.g., about 15 weight percent silicone oil). If the percentage of the lubricant is too high (e.g., more than about 30 weight percent), the lubricant may not properly mix with the polymeric material (e.g., thermoplastic gel).

In an alternative embodiment, the optical fibers may be coated with a liquid lubricant (e.g., silicone oil), which facilitates stripping of the buffer tube and the intermediate layer from the optical fibers. In such an alternative embodiment, the intermediate layer typically does not include a dispersed lubricant.

The buffer tube 13 is typically formed from a thermoplastic material. For example, the buffer tube 13 may be formed from polyester, such as polybutylene terephthalate (PBT), nucleated polybutylene terephthalate, or low-shrink polybutylene terephthalate; nylon, such as polyamide 12 (PA12), amorphous polyamide 12, or polyamide 11; polyvinyl chloride (PVC); polyolefins, such as polyethylene (PE) or polypropylene (PP); halogen-free flame retardant materials (HFRR); urethane polymers, such as urethane acrylates; and/or blends thereof.

In one exemplary embodiment, the buffer tube has an inner diameter of about 0.65 millimeter, an outer diameter of about 1.25 millimeters, and encloses four optical fibers each having an outer diameter of about 242 microns.

In another exemplary embodiment, the buffer tube has an inner diameter of about 0.55 millimeter, an outer diameter of about 1.05 millimeters, and encloses two optical fibers each having an outer diameter of about 242 microns.

For an optical-fiber module containing a single 242-micron optical fiber, the buffer tube typically has an outer diameter of about 900 microns. The buffer tube also typically has an inner diameter of between about 0.27 millimeter and 0.34 millimeter, more typically between about 0.3 millimeter and 0.34 millimeter (e.g., about 0.32 millimeter). In other words, an optical-fiber module containing a single 242-micron optical fiber typically has an intermediate-layer thickness of between about 15 microns and 50 microns (e.g., about 35 microns).

* * *

The optical-fiber modules according to the present invention may contain either multimode optical fibers or single-mode optical fibers.

In one embodiment, the present optical-fiber modules employ conventional multimode optical fibers having a 50-micron core (e.g., OM2 multimode optical fibers) and complying with the ITU-T G.651.1 recommendations. The ITU-T G.651.1 standard (07/2007) is hereby incorporated by reference in its entirety. Exemplary multimode optical fibers that may be employed include MaxCap™ multimode optical fibers (OM2+, OM3, or OM4), which are commercially available from Draka (Claremont, N.C.).

Alternatively, the present optical-fiber modules may include bend-insensitive multimode optical fibers, such as MaxCap™-BB-OMx multimode optical fibers, which are commercially available from Draka (Claremont, N.C.). In this regard, bend-insensitive multimode optical fibers typically have macrobending losses of (i) no more than 0.1 dB at a wavelength of 850 nanometers for a winding of two turns around a spool with a bending radius of 15 millimeters and (ii) no more than 0.3 dB at a wavelength of 1300 nanometers for a winding of two turns around a spool with a bending radius of 15 millimeters.

In contrast, conventional multimode optical fibers, in accordance with the ITU-T G.651.1 standard, have macrobending losses of (i) no more than 1 dB at a wavelength of 850 nanometers for a winding of two turns around a spool with a bending radius of 15 millimeters and (ii) no more than 1 dB at a wavelength of 1300 nanometers for a winding of two turns around a spool with a bending radius of 15 millimeters. Moreover, as measured using a winding of two turns around a spool with a bending radius of 15 millimeters, conventional multimode optical fibers typically have macrobending losses of (i) greater than 0.1 dB, more typically greater than 0.2 dB (e.g., 0.3 dB or more), at a wavelength of 850 nanometers and (ii) greater than 0.3 dB, more typically greater than 0.4 dB (e.g., 0.5 dB or more), at a wavelength of 1300 nanometers.

In another embodiment, the optical fibers employed in the present optical-fiber modules are conventional standard single-mode fibers (SSMF). Suitable single-mode optical fibers (e.g., enhanced single-mode fibers (ESMF)) that are compliant with the ITU-T G.652.D recommendations are commercially available, for instance, from Draka (Claremont, N.C.). The ITU-T G.652 recommendations (11/2009) and each of its attributes (i.e., A, B, C, and D) are hereby incorporated by reference in their entirety.

In another embodiment, bend-insensitive single-mode optical fibers may be employed in the optical-fiber modules according to the present invention. Bend-insensitive optical fibers are less susceptible to attenuation (e.g., caused by microbending or macrobending). Exemplary single-mode glass fibers for use in the present optical-fiber modules are commercially available from Draka (Claremont, N.C.) under the trade name BendBright®, which is compliant with the ITU-T G.652.D recommendations. That said, it is within the scope of the present invention to employ a bend-insensitive glass fiber that meets the ITU-T G.657.A recommendations (e.g., the ITU-T G.657.A1 (11/2009) and the ITU-T G.657.A2 (11/2009) subcategories) and/or the ITU-T G.657.B recommendations (e.g., the ITU-T G.657.B2 (11/2009) and the ITU-T G.657.B3 (11/2009) subcategories). The ITU-T G.657.A/B recommendations are hereby incorporated by reference in their entirety.

In this regard, exemplary bend-insensitive single-mode glass fibers for use in the present invention are commercially available from Draka (Claremont, N.C.) under the trade name BendBright$^{XS}$®, which is compliant with both the ITU-T G.652.D and ITU-T G.657.A/B recommendations. BendBright$^{XS}$® optical fibers demonstrate significant improvement with respect to both macrobending and microbending.

As set forth in commonly assigned International Patent Application No. PCT/US08/82927 for a Microbend-Resistant Optical Fiber, filed Nov. 9, 2008, (Overton) (and its counterpart International Patent Application Publication No. WO 2009/062131 A1) and U.S. patent application Ser. No. 12/267,732 for a Microbend-Resistant Optical Fiber, filed Nov. 10, 2008, (Overton) (and its counterpart U.S. Patent Application Publication No. US2009/0175583 A1), pairing a bend-insensitive glass fiber (e.g., Draka's single-mode glass fibers available under the trade name BendBright$^{XS}$®) and a primary coating having very low modulus achieves optical fibers having exceptionally low losses (e.g., reductions in microbend sensitivity of at least 10× as compared with a single-mode optical fiber employing a conventional coating system). The optical-fiber modules according to the present invention may employ the coatings disclosed in International Patent Application Publication No. WO 2009/062131 A1 and U.S. Patent Application Publication No. US2009/0175583 A1, which are hereby incorporated by reference in their entirety, with either single-mode optical fibers or multimode optical fibers.

The optical fibers employed with the present optical-fiber modules may also comply with the IEC 60793 and IEC 60794 standards, which are hereby incorporated by reference in their entirety.

Optical fibers typically have an outer diameter of between about 235 microns and 265 microns, although optical fibers having a smaller diameter are within the scope of the present invention.

By way of example, the component glass fiber may have an outer diameter of about 125 microns. With respect to the optical fiber's surrounding coating layers, the primary coating may have an outer diameter of between about 175 microns and 195 microns (i.e., a primary coating thickness of between about 25 microns and 35 microns), and the secondary coating may have an outer diameter of between about 235 microns and 265 microns (i.e., a secondary coating thickness of between about 20 microns and 45 microns). Optionally, the optical fiber may include an outermost ink layer, which is typically between two and ten microns.

* * *

The optical-fiber modules according to the present invention have improved accessibility. In this regard, accessibility may be tested by determining the length of the buffer tube and intermediate layer that can be substantially removed in a single operation to permit access to the optical fiber(s).

Typically at least about 300 millimeters of the buffer tube and intermediate layer can be removed in a single operation (i.e., in one piece) using a strip force of less than about 20 N (e.g., using a strip force of about 10 N or less). More typically, at least about 400 millimeters of the buffer tube and intermediate layer can be removed in a single operation using a strip force of no more than about 20 N (e.g., using a strip force of less than about 15 N).

In a particular embodiment, at least about 600 millimeters of the buffer tube and the intermediate layer can be removed in a single operation using a strip force of no more than about 20 N. In another particular embodiment, at least about 600 millimeters of the buffer tube and the intermediate layer can be removed in a single operation using a strip force of no more than about 10 N. In yet another particular embodiment, at least about 1200 millimeters of the buffer tube and the intermediate layer can be removed in a single operation using a strip force of no more than about 20 N (e.g., less than about 15 N).

Figure 3:
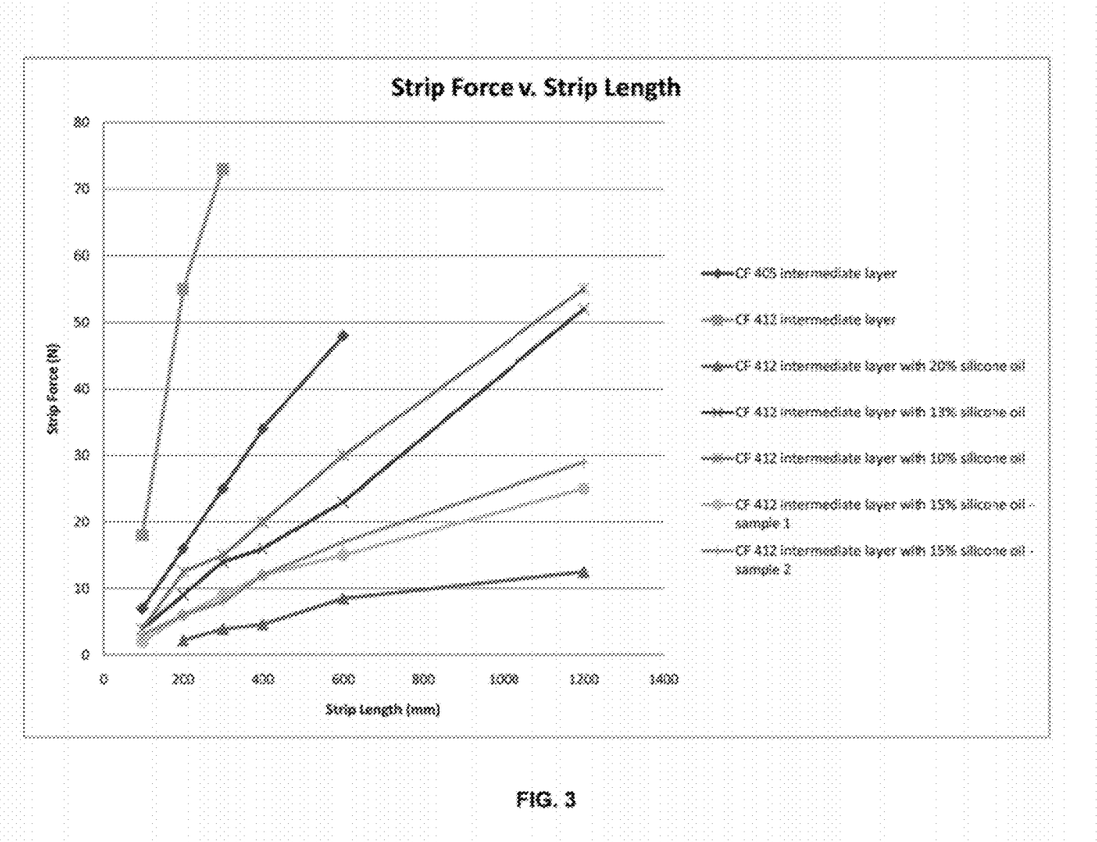
FIG. 3 depicts strippability data for optical-fiber modules having varying amounts of silicone oil in their respective intermediate layers.

Accordingly, the optical fiber(s) inside the present optical-fiber modules can be quickly accessed with minimal risk of damage to the remainder of the optical-fiber modules, particularly the constituent optical fibers. In this regard, FIG. 3 depicts strippability testing data for optical-fiber modules having varying amounts of silicone oil dispersed in their respective intermediate layers.

Each tested optical-fiber module included two optical fibers. Furthermore, each tested optical-fiber module included a PA12 buffer tube having an inner diameter of 0.55 millimeter and an outer diameter of 1.05 millimeters.

In testing the strippability of an optical-fiber module, a ring cut was made in the module's buffer tube and underlying intermediate layer at a specified distance (i.e., the distance to be stripped, such as 300 millimeters or 600 millimeters) from the end of the module. Next, a glass-fiber-reinforced pressure-sensitive tape was applied over the module from the ring cut to about ten centimeters past the end of the module (i.e., so that about ten centimeters of the tape was free). After the tape was applied to the module, a dynamometer was attached to the free end of the pressure-sensitive tape. The portion of the module not being stripped was coiled around a 30-millimeter-diameter mandrel for five or six turns. A tape was applied over the coiled portion of the module to further couple the module to the mandrel. A force was applied to the buffer tube to strip the buffer tube and the intermediate layer from the optical fibers contained therein at a speed of about 20 millimeters per second to 50 millimeters per second. The force required to strip the portion specified portion of the buffer tube and intermediate layer was measured using the dynamometer.

* * *

The present optical-fiber modules have excellent attenuation performance over a wide temperature range.

In this regard, the attenuation of the optical-fiber modules (e.g., units) can be measured using temperature cycle testing. For example, a sample of an optical-fiber unit may be temperature cycled from −40° C. to 70° C. This temperature cycling may be performed twice on the sample (e.g., two cycles from −40° C. to 70° C.).

Optical-fiber modules containing single-mode bend-insensitive optical fibers typically have a maximum increase in attenuation (i.e., added loss) of less than 0.1 dB/km (e.g., less than about 0.05 dB/km) at wavelengths of 1550 nanometers and 1625 nanometers, respectively, during two successive temperature cycles from −40° C. to 70° C. More typically, optical-fiber modules containing single-mode, bend-insensitive optical fibers have a maximum increase in attenuation of less than 0.025 dB/km (e.g., less than about 0.01 dB/km) at wavelengths of 1550 nanometers and 1625 nanometers, respectively, during two temperature cycles from −40° C. to 70° C.

Figure 4A:
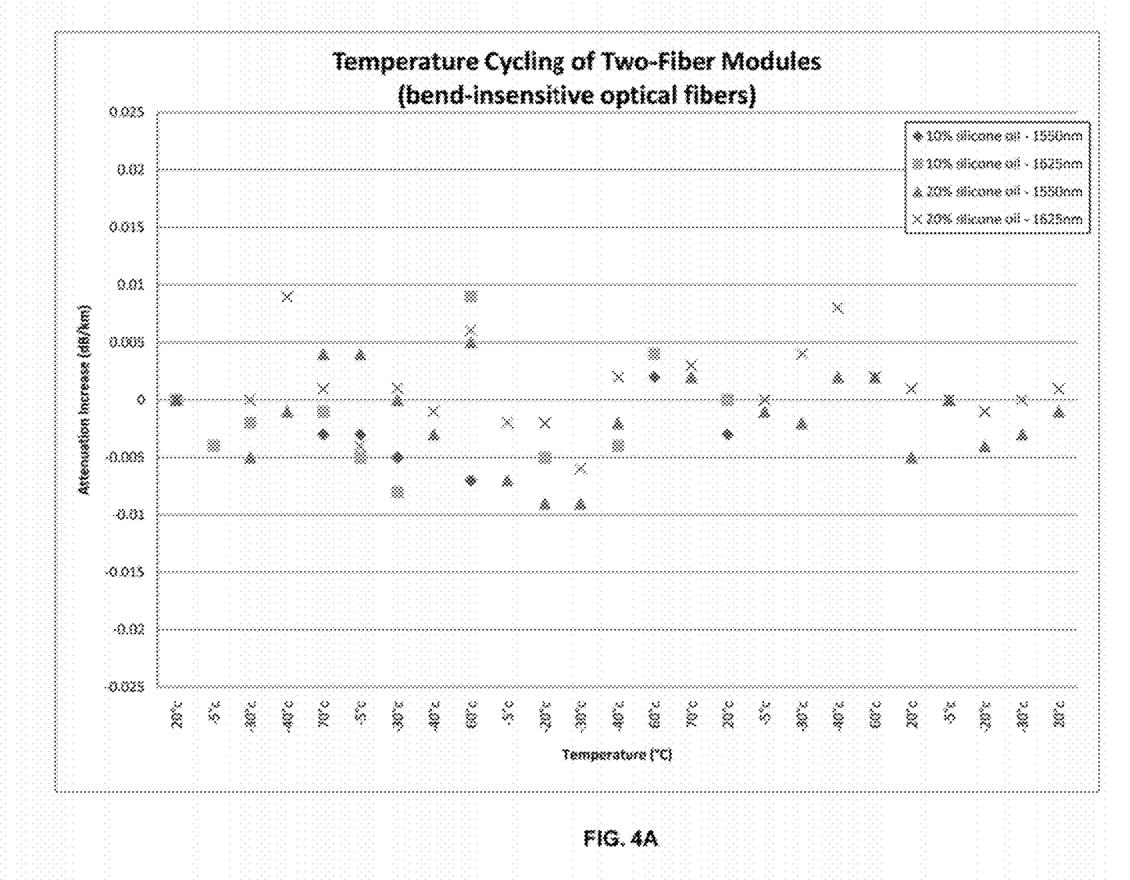
FIG. 4A depicts attenuation data for exemplary optical-fiber modules having bend-insensitive optical fibers.

FIG. 4A depicts attenuation data for exemplary optical-fiber modules. Each tested optical-fiber module included two single-mode bend-insensitive optical fibers compliant with the ITU-T G.657.A2 recommendations. Furthermore, each tested optical-fiber module included a PA12 buffer tube having an inner diameter of 0.55 millimeter and an outer diameter of 1.05 millimeters. The intermediate layer in each tested optical-fiber module was formed from Macroplast CF 412.

Figure 4B:
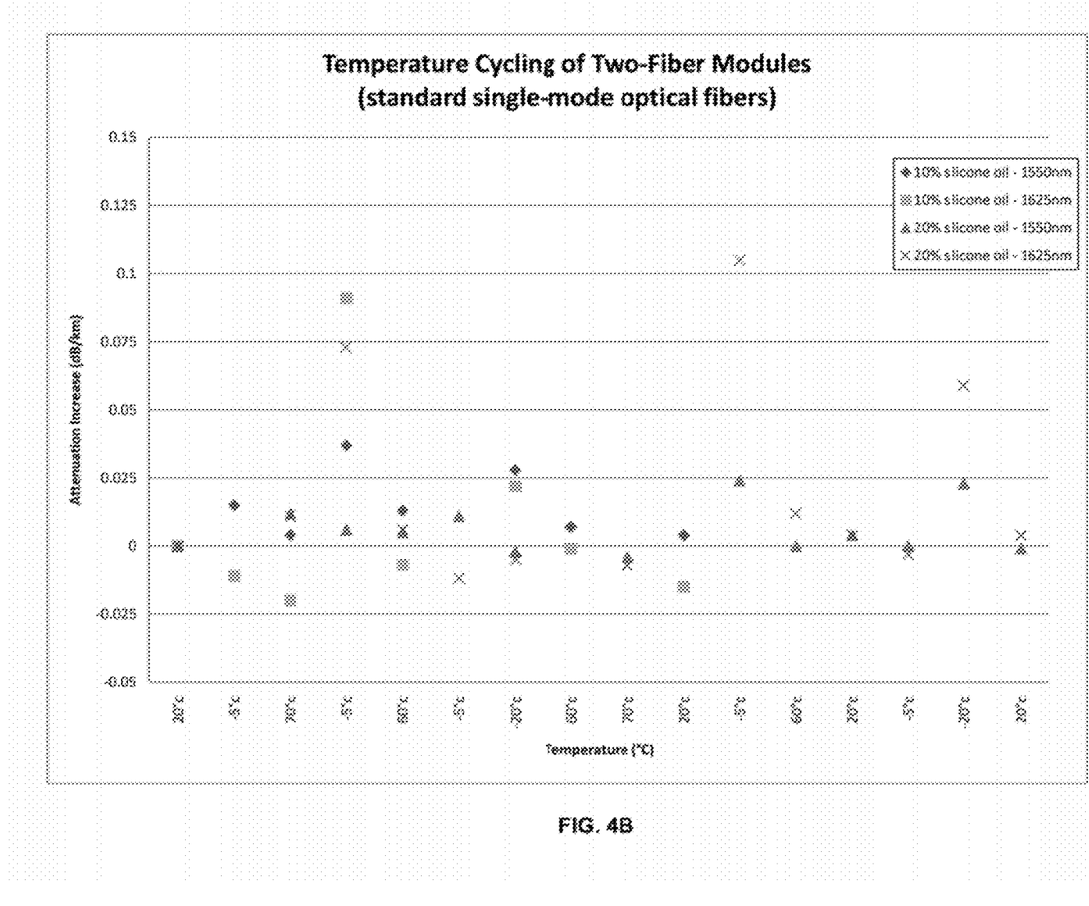
FIG. 4B depicts attenuation data for exemplary optical-fiber modules having standard single-mode optical fibers.

FIG. 4B depicts attenuation data for exemplary optical-fiber modules, each containing two optical fibers compliant with the ITU-T G.652.D recommendations. As depicted in FIG. 4B, modules containing conventional standard single-mode optical fibers (SSMF) have satisfactory attenuation performance (e.g., having a maximum increase in attenuation of less than about 0.1 dB/km at wavelengths of 1550 nanometers and 1625 nanometers, respectively, during two successive temperature cycles from −20° C. to 70° C.)

\* \* \*

In another aspect, the present invention embraces a method of manufacturing an optical-fiber module.

To create an intermediate layer that includes a liquid lubricant (e.g., silicone oil), a thermoplastic gel is softened by heating (e.g., to lower its viscosity). The liquid lubricant is then added to the thermoplastic gel. The thermoplastic gel is mixed to ensure uniform distribution of the liquid lubricant within the thermoplastic gel. After being mixed, the thermoplastic gel can be cooled.

To form an optical-fiber module, an intermediate layer and a buffer tube may be concurrently extruded around one or more optical fibers. Alternatively, the intermediate layer is first extruded around the optical fiber(s). Afterwards, the buffer tube is extruded around the intermediate layer and the optical fiber(s). The material used to form the buffer tube and the intermediate layer are typically heated to facilitate extrusion. For example, the material used to form the intermediate layer is typically heated to a temperature of between about 130° C. and 180° C., more typically between about 150° C. and 180° C. (e.g., about 160° C.).

As noted, the optical fiber(s) may also be coated with a liquid lubricant before the intermediate layer and the buffer tube are extruded around the optical fiber(s).

\* \* \*

In yet another aspect, the present invention embraces an optical-fiber cable containing one or more optical-fiber modules.

Figure 5:
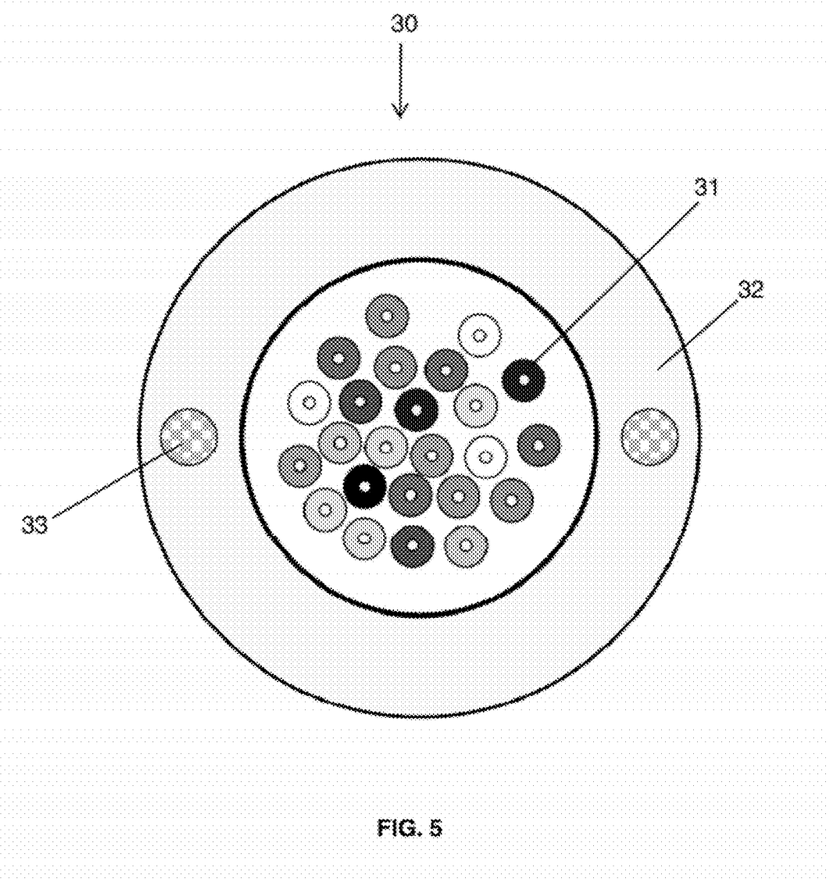
FIG. 5 schematically depicts an exemplary optical-fiber cable in accordance with the present invention.

FIG. 5 depicts an exemplary optical-fiber cable 30. The optical-fiber cable 30 includes one or more optical-fiber modules 31 in accordance with the present invention (e.g., the optical-fiber modules 10 as depicted in FIGS. 1 and 2). FIG. 5 shows optical-fiber cable 30 having 24 optical-fiber modules 31.

A cable jacket 32, which encloses the optical-fiber modules 31, may be a single-layer jacket formed from a dielectric material (e.g., non-conducting polymers). By way of example, the cable jacket 31 may be formed from flexible, plenum-grade polymeric materials, such as polyvinyl chloride (PVC), polyethylene, polypropylene, polyamides (e.g., nylon), or polyester (e.g., PBT). In a typical embodiment, the cable jacket 31 is formed from a halogen-free flame retardant (HFFR) material. The cable jacket 13 may also contain other additives, such as nucleating agents, flame retardants, smoke-retardants, antioxidants, UV absorbers, and/or plasticizers.

The cable jacket 32 may include supplemental structural components for providing improved protection and strength. For example, one or more (e.g., two) radial strength members 33 may be incorporated into the cable jacket 32. The radial strength members may be formed from metal or fiberglass (e.g., glass reinforced plastic "GRP"). The radial strength members 33 help to limit the deformations of the cable 30 due to traction forces (e.g., traction forces that occur during the laying of the cable 30 in a conduit). The radial strength members 33 also help to limit the axial deformations of the cable 30 caused by contraction and expansion of the cable jacket 32, which may occur when the cable 30 is subject to large changes in temperature.

As noted, optical-fiber modules in accordance with the present invention are capable of operating within a wide temperature range.

Accordingly, the present optical-fiber cable may be tested in accordance with the IEC 60794-1-1-F1 temperature cycling test standard. In one embodiment, the present optical-fiber cable has a change in attenuation (i.e., added loss) of no more than about 0.2 dB/km measured during or after temperature cycling from −5° C. to 50° C. in accordance with the IEC 60794-1-1-F1 temperature cycling test standard.

Alternatively, the present optical-fiber cable may be temperature cycled from −40° C. to 70° C. This temperature cycling may be performed twice on the sample (e.g., two cycles from −40° C. to 70° C.). As illustrated by the testing data depicted in FIGS. 6 and 7, optical-fiber cables in accordance with the present invention typically have a maximum increase in attenuation (i.e., added loss) of less than about 0.04 dB/km (e.g., less than about 0.02 dB/km) at wavelengths of 1550 nanometers and 1625 nanometers, respectively, during two successive temperature cycles from −40° C. to 70° C.

Figure 6:
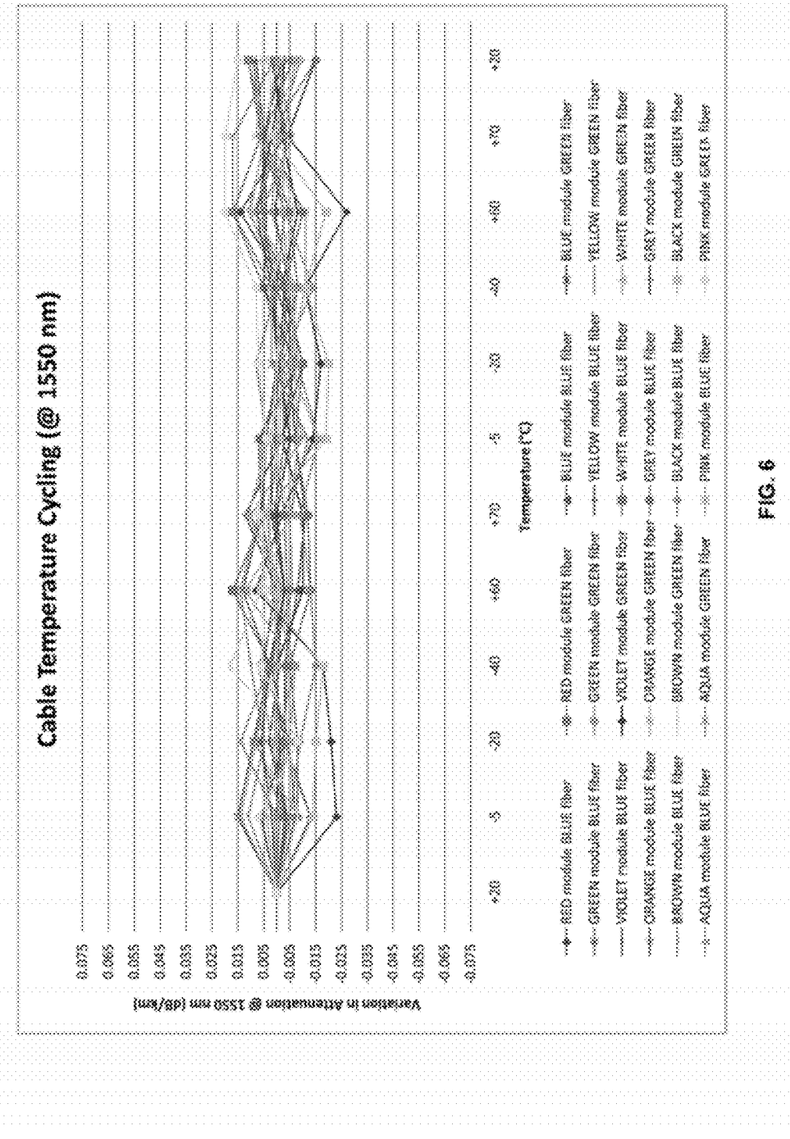
FIG. 6 depicts attenuation data for an exemplary optical-fiber cable in accordance with the present invention.
Figure 7:
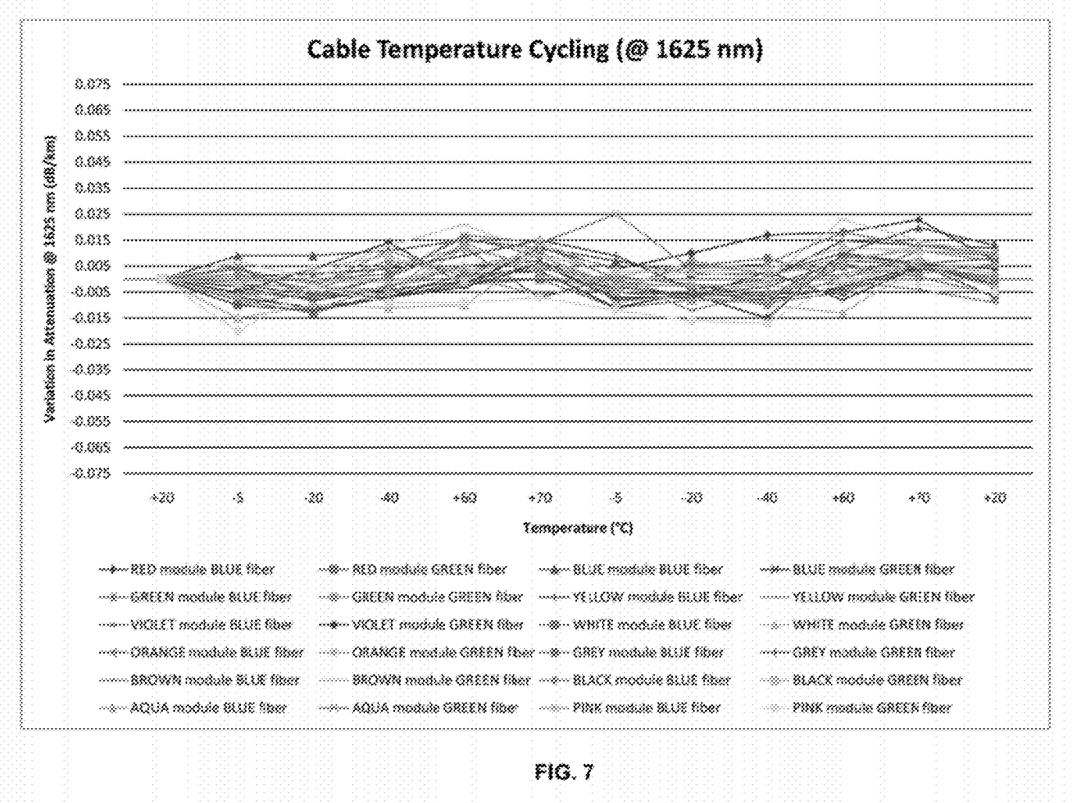
FIG. 7 depicts additional attenuation data for an exemplary optical-fiber cable in accordance with the present invention.

With respect to FIGS. 6 and 7, each tested optical-fiber cable included 12 optical-fiber modules. Each module included two single-mode bend-insensitive optical fibers compliant with the ITU-T G.657.A2 recommendations. Each module included a PA12 buffer tube having an inner diameter of 0.55 millimeter and an outer diameter of 1.05 millimeters surrounding the optical fibers. The intermediate layer in each module was formed from Macroplast CF 412 and included 13 percent silicone oil. Each tested optical-fiber cable had a cable jacket formed from a halogen-free flame retardant (HFFR) material with an inner diameter of 5.6 millimeters and an outer diameter of 10 millimeters. Each tested optical-fiber cable had two GRP, radial strength members with a diameter of 1.0 millimeter.

An optical-fiber cable according to the present invention is particularly well suited for the distribution of an optical telecommunications network within a building. To facilitate the distribution of the optical telecommunications network within a building, optical-fiber modules 31 may be diverted from the optical-fiber cable 30. To divert optical-fiber modules 31 from the optical-fiber cable 30, two cut-outs are made in the cable jacket 32 in order to create (i) a first opening through which an optical-fiber module 31 is cut and (ii) a second opening through which the cut optical-fiber module 31 is pulled out in order to be diverted. The distance between the first and second cuts is typically about 20 meters, thereby allowing a 20-meter length of the optical-fiber module 31 to be diverted.

* * *

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. Patent Application Publication No. US2011/0044595 A1 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Patent Application Publication No. US2010/0254653 A1 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Publication No. US2011/0116160 A1 for a Rare-Earth-Doped Optical Fiber Having Small Numerical Aperture, filed Nov. 11, 2010, (Boivin et al.); U.S. Patent Publication No. US2011/0123161 A1 for a High-Bandwidth, Multimode Optical Fiber with Reduced Cladding Effect, filed Nov. 24, 2010, (Molin et al.); U.S. Patent Publication No. US2011/0123162 A1 for a High-Bandwidth, Dual-Trench-Assisted Multimode Optical Fiber, filed Nov. 24, 2010, (Molin et al.); U.S. Patent Publication No. US2011/0135262 A1 for a Multimode Optical Fiber with Low Bending Losses and Reduced Cladding Effect, filed Dec. 3, 2010, (Molin et al.); U.S. Patent Publication No. US2011/0135263 A1 for a High-Bandwidth Multimode Optical Fiber Having Reduced Bending Losses, filed Dec. 3, 2010, (Molin et al.); U.S. Patent Publication No. US2011/0188826 A1 for a Non-Zero Dispersion Shifted Optical Fiber Having a Large Effective Area, filed Jan. 31, 2011, (Sillard et al.); U.S. Patent Publication No. US2011/0188823 A1 for a Non-Zero Dispersion Shifted Optical Fiber Having a Short Cutoff Wavelength, filed Jan. 31, 2011, (Sillard et al.); U.S. patent pplication Ser. No. 13/037,943 for a Broad-Bandwidth Multimode Optical Fiber Having Reduced Bending Losses, filed Mar. 1, 2011, (Bigot-Astruc et al.); U.S. patent application Ser. No. 13/048,028 for a Single-Mode Optical Fiber, filed Mar. 15, 2011, (de Montmorillon et al.); U.S. patent application Ser. No. 13/175,181 for a Single-Mode Optical Fiber, filed Jul. 1, 2011, (Bigot-Astruc et al.); and U.S. patent application Ser. No. 13/206,943 for a Method of Fabricating an Optical Fiber Preform, filed Aug. 10, 2011, (de Montmorillon et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Publication No. 2011/0069932 A1 for a High-Fiber-Density Optical-Fiber Cable, filed Oct. 19, 2010, (Overton et al.); U.S. Patent Publication No. 2011/0091171 A1 for an Optical-Fiber Cable Having High Fiber Count and High Fiber Density, filed Oct. 19, 2010, (Tatat et al.); U.S. Patent Publication No. 2011/0176782 A1 for a Water-Soluble Water-Blocking Element, filed Jan. 19, 2011, (Parris); U.S. Patent Application No. 13/096,178 for a Data-Center Cable, filed Apr. 28, 2011, (Lovie et al.); U.S. patent application Ser. No. 13/099,663 for a Bundled Fiber Optic Cables, filed May 3, 2011, (Quinn et al.); U.S. patent application Ser. No. 13/111,147 for a Curing Apparatus Employing Angled UVLEDs, filed May 19, 2011, (Molin); U.S. patent application Ser. No. 13/116,141 for a Low-Smoke and Flame-Retardant Fiber Optic Cables, filed May 26, 2011, (Lovie et al.); U.S. patent application Ser. No. 13/152,651 for a Curing Apparatus Having UV Sources That Emit Differing Ranges of UV Radiation, filed Jun. 3, 2011, (Gharbi et al.); U.S. patent application Ser. No. 13/181,762 for a Adhesively Coupled Optical Fibers and Enclosing Tape, filed Jul. 13, 2011, (Parris); and U.S. patent application Ser. No. 13/206,601 for a Method and Apparatus Providing Increased UVLED Intensity, filed Aug. 10, 2011, (Overton).

\* \* \*

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical-fiber module, comprising:
one or more optical fibers;
an intermediate layer enclosing said one or more optical fibers, said intermediate layer comprising (i) a polymeric medium and (ii) less than about 30 weight percent of a liquid lubricant dispersed within said polymeric medium; and
a buffer tube enclosing said one or more optical fibers and said intermediate layer;
wherein at least about 300 millimeters of said buffer tube and said intermediate layer can be substantially removed from said one or more optical fibers in a single operation using a strip force of less than about 20 N.

2. The optical-fiber module according to claim 1, comprising a plurality of optical fibers.

3. The optical-fiber module according to claim 1, wherein the optical-fiber module includes exactly one optical fiber.

4. The optical-fiber module according to claim 1, comprising a single-mode optical fiber.

5. The optical-fiber module according to claim 1, comprising a single-mode optical fiber that complies with the ITU-T G.657.A recommendations and/or the ITU-T G.657.B recommendations.

6. The optical-fiber module according to claim 1, comprising a multimode optical fiber.

7. The optical-fiber module according to claim 1, comprising a multimode optical fiber that complies with the ITU-T G.651.1 recommendations.

8. The optical-fiber module according to claim 1, wherein said polymeric medium comprises a thermoplastic gel.

9. The optical-fiber module according to claim 1, wherein said liquid lubricant comprises silicone oil.

10. The optical-fiber module according to claim 1, wherein said intermediate layer comprises between about 10 weight percent and 20 weight percent silicone oil.

11. The optical-fiber module according to claim 1, wherein there is substantially no free space between said one or more optical fibers and said intermediate layer.

12. The optical-fiber module according to claim 1, wherein there is substantially no annular free space between said intermediate layer and said buffer tube.

13. The optical-fiber module according to claim 1, wherein:
each said optical fiber is a single-mode optical fiber; and
during two temperature cycles from −40° C. to 70° C., each said optical fiber has a maximum increase in attenuation of less than about 0.1 dB/km at wavelengths of 1550 nanometers and 1625 nanometers.

14. The optical-fiber module according to claim 1, wherein:
each said optical fiber is a single-mode optical fiber; and
during two temperature cycles from −40° C. to 70° C., each said optical fiber has a maximum increase in attenuation of less than about 0.05 dB/km at wavelengths of 1550 nanometers and 1625 nanometers.

15. The optical-fiber module according to claim 1, wherein:
each said optical fiber is a single-mode optical fiber; and
during two temperature cycles from −40° C. to 70° C., each said optical fiber has a maximum increase in attenuation of less than about 0.025 dB/km at wavelengths of 1550 nanometers and 1625 nanometers.

16. The optical-fiber module according to claim 1, wherein at least about 400 millimeters of said buffer tube and said intermediate layer can be substantially removed from said one or more optical fibers in a single operation using a strip force of less than about 15 N.

17. The optical-fiber module according to claim 1, wherein at least about 600 millimeters of said buffer tube and said intermediate layer can be substantially removed from said one or more optical fibers in a single operation using a strip force of less than about 20 N.

18. The optical-fiber module according to claim 1, wherein at least about 600 millimeters of said buffer tube and said intermediate layer can be substantially removed from said one or more optical fibers in a single operation using a strip force of less than about 10 N.

19. The optical-fiber module according to claim 1, wherein at least about 1200 millimeters of said buffer tube and said intermediate layer can be substantially removed from said one or more optical fibers in a single operation using a strip force of less than about 20 N.

20. An optical-fiber module, comprising:
one or more optical fibers;
an intermediate layer enclosing said one or more optical fibers, said intermediate layer comprising (i) a polymeric medium and (ii) between about 10 weight percent and 20 weight percent silicone oil dispersed within said polymeric medium; and
a buffer tube enclosing said one or more optical fibers and said intermediate layer;
wherein at least about 300 millimeters of said buffer tube and said intermediate layer can be substantially removed from said one or more optical fibers in a single operation using a strip force of less than about 20 N.

21. An optical-fiber module, comprising:
a plurality of single-mode optical fibers, each said single-mode optical fiber complying with the ITU-T G.657.A recommendations and/or the ITU-T G.657.B recommendations;
an intermediate layer enclosing said plurality of single-mode optical fibers, said intermediate layer comprising (i) a polymeric medium and (ii) less than about 30 weight percent of a liquid lubricant dispersed within said polymeric medium; and
a buffer tube enclosing said plurality of single-mode optical fibers and said intermediate layer;
wherein during two temperature cycles from −40° C. to 70° C., each said single-mode optical fiber has a maximum increase in attenuation of less than about 0.05 dB/km at wavelengths of 1550 nanometers and 1625 nanometers; and
wherein at least about 300 millimeters of said buffer tube and said intermediate layer can be substantially removed from said plurality of single-mode optical fibers in a single operation using a strip force of less than about 20 N.

22. The optical-fiber module according to claim 1, wherein said polymeric medium comprises mostly thermoplastic gel having (i) a glass transition temperature of less than about −40° C. and (ii) a penetrability of at least about 1.0 millimeter over the temperature range of −30° C. to 70° C. as measured in accordance with the NFT 60-119 standard with an application time of five seconds.

* * * * *